United States Patent
Zhang

(10) Patent No.: US 7,929,649 B2
(45) Date of Patent: Apr. 19, 2011

(54) ANALOG/DIGITAL CARRIER DIFFERENTIATION IN DIGITAL CABLE RECEIVERS

(75) Inventor: Su Zhang, Naperville, IL (US)

(73) Assignee: STMicroelectronics, Inc., Coppell, TX (US)

( * ) Notice: Subject to any disclaimer, the term of this patent is extended or adjusted under 35 U.S.C. 154(b) by 1147 days.

(21) Appl. No.: 10/882,690

(22) Filed: Jun. 30, 2004

(65) Prior Publication Data

US 2006/0002494 A1 Jan. 5, 2006

(51) Int. Cl.
*H04L 27/08* (2006.01)

(52) U.S. Cl. .................................. 375/345; 375/316

(58) Field of Classification Search .............. 375/345, 375/316; 330/129, 254; 455/234.1
See application file for complete search history.

(56) References Cited

U.S. PATENT DOCUMENTS

| | | | | | |
|---|---|---|---|---|---|
| 4,585,998 | A | * | 4/1986 | Veillard | 329/50 |
| 6,100,835 | A | * | 8/2000 | Hamilton | 341/155 |
| 6,333,767 | B1 | * | 12/2001 | Patel et al. | 348/725 |
| 6,668,027 | B1 | * | 12/2003 | Scarpa | 375/345 |
| 6,725,463 | B1 | * | 4/2004 | Birleson | 725/151 |
| 6,963,623 | B2 | * | 11/2005 | Ninomiya et al. | 375/326 |
| 7,027,106 | B2 | * | 4/2006 | Takagi et al. | 348/731 |
| 7,203,256 | B2 | * | 4/2007 | Lin et al. | 375/340 |

FOREIGN PATENT DOCUMENTS

EP   1406402 A2 *   4/2004

\* cited by examiner

*Primary Examiner* — Shuwang Liu
*Assistant Examiner* — Helene Tayong
(74) *Attorney, Agent, or Firm* — Lisa K. Jorgenson; William A. Munck

(57) ABSTRACT

A communication signal carrier on a communication channel in a digital cable receiver can be characterized as analog without exhaustively attempting to determine a symbol rate or modulation scheme of a digital carrier. The signal level in the channel is observed at different channel bandwidths, and these observations are used to differentiate between analog and digital carriers.

20 Claims, 3 Drawing Sheets

| CHANNEL BANDWIDTH | AGGREGATE POWER ON ANALOG (dBm) | AGGREGATE POWER ON DIGITAL (dBm) |
|---|---|---|
| 2MHz | -75 | -54.40 |
| 3MHz | -70 | -52.72 |
| 4MHz | -47.5 | -51.60 |
| 5MHz | -47.2 | -50.66 |
| 6MHz | -47.0 | -50.49 |
| 7MHz | -46.11 | -50.48 |

| SYMBOL RATE | ACCUMULATOR VALUE ON DIGITAL | ACCUMULATOR VALUE ON ANALOG |
|---|---|---|
| 1M | 225k | 258k |
| 2M | 262k | 251k |
| 3M | 281k | 226k |
| SUM(1:3) | 768k | 735k |
| 4M | 297k | 180k |
| 5M | 310k | 147k |
| 6M | 336k | 112k |
| SUM(4:6) | 943k | 439k |

ANALOG/DIGITAL CARRIER DIFFERENTIATION IN DIGITAL CABLE RECEIVERS

FIELD OF THE INVENTION

The invention relates generally to digital cable receivers and, more particularly, to the identification of digital and analog carriers in such receivers.

BACKGROUND OF THE INVENTION

FIG. 1 diagrammatically illustrates the demodulator section of a conventional digital cable receiver device. An analog control loop includes a tuner 11, an A/D converter 13, and wideband (analog) AGC (automatic gain control) 15. The initdemod module 17 moves the input signal spectrum centered on a small IF frequency to the DC level. The Nyquist filtering 19 folds the roll-off part of the spectrum out of the Nyquist bandwidth into the in-band, and filters interference out of the Nyquist bandwidth. A digital AGC stage 21 adjusts the amplitude of the demodulated symbols to compensate for the energy that has been filtered out by the Nyquist filter, and also to compensate for the gain of the Nyquist filter, which gain depends on the ratio between the (fixed) sampling clock frequency and the (arbitrary) symbol rate. The bandwidth of the Nyquist filter is controlled by setting the symbol rate of the receiver.

Conventionally, the carrier recovery, equalizer and FEC decoder module at 23 determines whether an input carrier signal is a digital carrier or an analog carrier. This module implements a scanning algorithm which, for example, scans all different symbol rates and QAM modes that may be present in a real-world cable network. For a digital carrier, and continuing with the aforementioned QAM example, the scanning algorithm will lock on the symbol rate/QAM mode associated with the digital carrier. However, the scanning algorithm can only identify an analog carrier by scanning through all possible symbol rate/QAM mode combinations, and failing to lock on any of the possible combinations. As a result, the time consumed exhaustively scanning across the whole frequency range can become prohibitively long.

It is desirable in view of the foregoing to provide an effective technique for differentiating between analog and digital carriers in digital cable communication receivers.

Exemplary embodiments of the invention observe the signal level in the communication channel of the digital cable receiver at different channel bandwidths, and use these observations to differentiate between analog and digital carriers, without resort to the carrier recovery scanning algorithm.

BRIEF DESCRIPTION OF THE DRAWINGS

The invention will now be described with the reference to the accompanying drawings FIG. 1 diagrammatically illustrates the demodulator section of a conventional digital cable receiver.

DETAILED DESCRIPTION OF THE INVENTION

Figure 1:
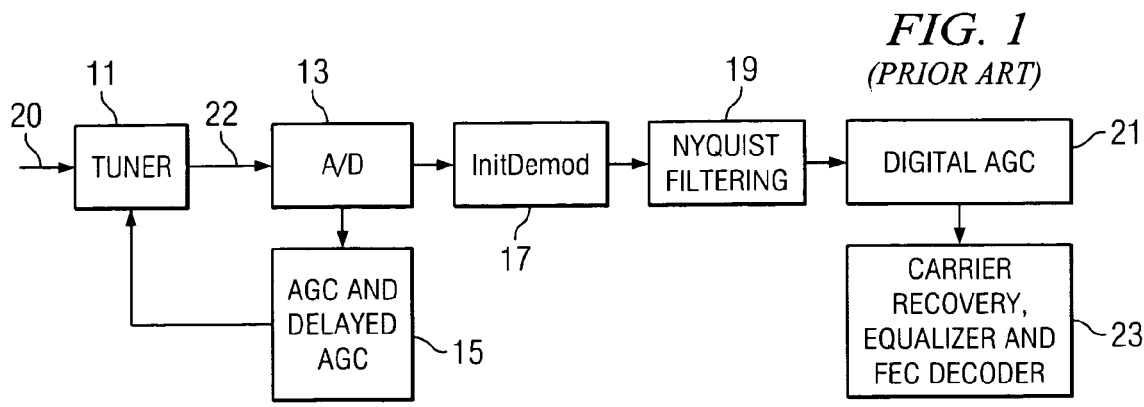

Exemplary embodiments of the invention exploit the fact that the digital AGC 21 of FIG. 1 monitors and tracks signal level changes after the analog AGC 15 has locked. For example, given a QAM signal input at 20 into the tuner 11, if the analog AGC 15 is allowed to free-run and then lock, the accumulator value in the digital AGC 21 might be, for example, 266 k. If the receiver freezes the analog AGC 15 at this time, and if the signal level at the input 22 of the A/D converter 13 is attenuated by 20 dB, then the accumulator value in the digital AGC 21 would change to nearly 510 k. This increase in the accumulator value of the digital AGC 21 reflects the fact that the digital AGC 21 has tracked the signal attenuation and adjusted the accumulator value appropriately to increase the gain to compensate for signal attenuation.

Figure 2:
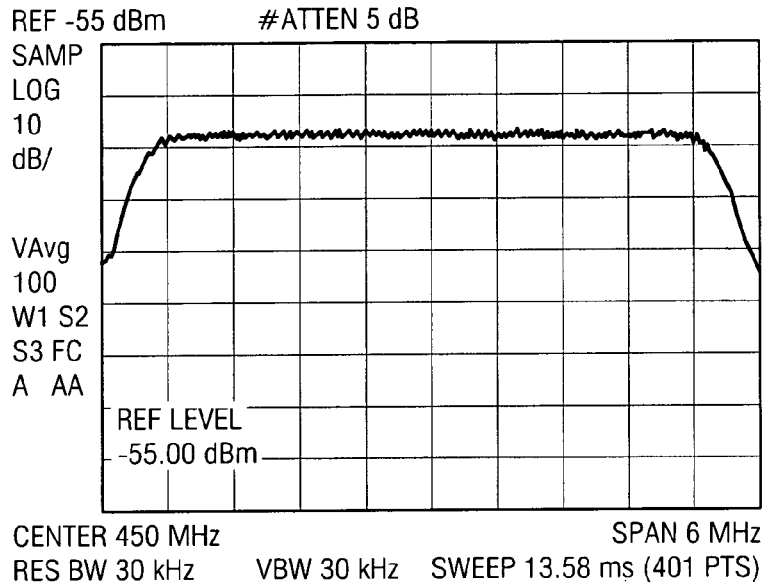
FIG. 2 graphically illustrates the spectrum of a QAM digital carrier.
Figure 3:
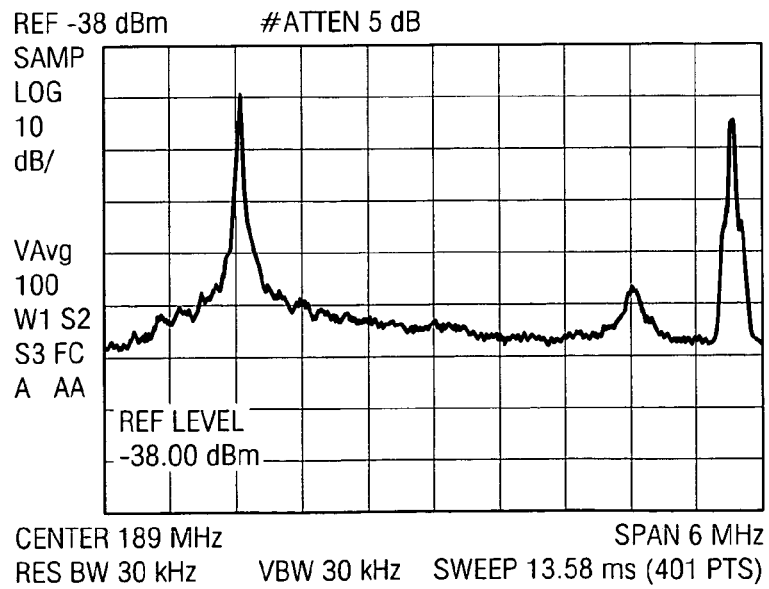
FIG. 3 graphically illustrates the spectrum of a NTSC analog carrier.

FIGS. 2 and 3 illustrate that the frequency spectrum of a digital carrier is quite different from the frequency spectrum of an analog carrier. More specifically, the FIG. 2 frequency spectrum for a digital carrier (a QAM digital carrier in this example) is flat across a six (6) MHz frequency bandwidth, whereas the frequency spectrum of the analog carrier in FIG. 3 (an NTSC carrier in this example) is not flat, but rather exhibits three (3) distinct spikes corresponding to the video carrier, the audio carrier and the chroma carrier. The signal energy is centered on these three constituent carriers. The FIG. 3 carrier is US off-the-air channel 28, whose channel center is at 189 MHz, with the video carrier at 187.25 MHz, the audio carrier at 191.75 MHz and the chroma carrier at 190.83 MHz.

Figures 4, 5, 8:
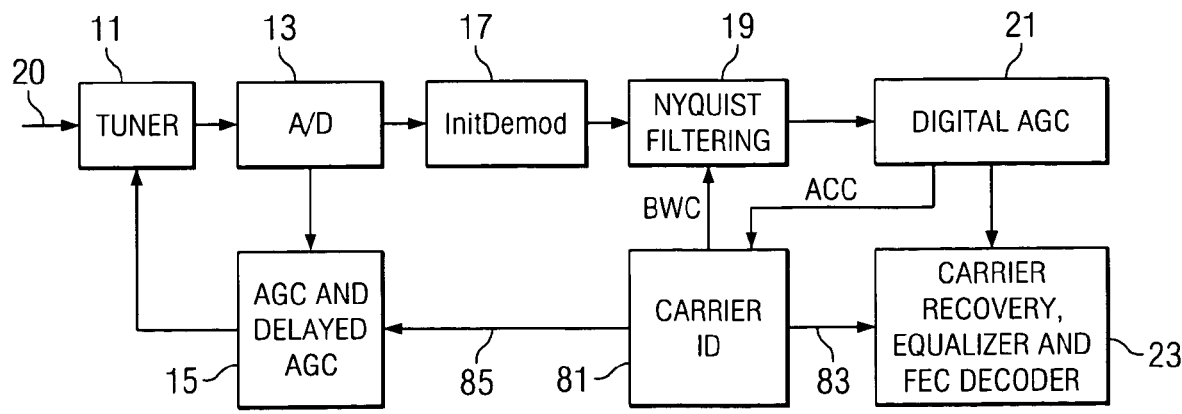
FIG. 4 illustrates in tabular format the signal power versus channel bandwidth in the demodulator of FIG. 1 for both analog and digital carriers.
FIG. 5 illustrates in tabular format accumulator values in the digital AGC of FIG. 1 for both analog and digital carriers at various symbol rates.
FIG. 8 diagrammatically illustrates exemplary embodiments of a demodulator of a digital cable communication receiver according to the invention.

Continuing with the FIG. 3 example of US off-the-air channel 28, FIG. 4 illustrates that the aggregate power of the analog carrier for this channel drops significantly when the channel bandwidth is reduced to 3 MHz. This is because the video carrier frequency and the audio carrier frequency are separated by more than 3 MHz. The aggregate power for the digital QAM carrier of FIG. 2, which has a channel center of 450 MHz and a symbol rate of 5.125 Mbaud, also decreases with decreasing bandwidth, but the decrease associated with the digital carrier, for a channel bandwidth change from 4 MHz to 3 MHz, is not nearly as significant as the decrease associated with the analog carrier for the same bandwidth change.

Continuing with the same exemplary analog and digital carriers described above, FIG. 5 illustrates how the accumulator values of the digital AGC 21 change with the channel bandwidth (shown as the symbol rate in FIG. 5), for both the analog and digital carriers. As mentioned above, these accumulator values represent the ability of the digital AGC 21 to track and compensate for signal level changes after the analog AGC 15 has locked and then frozen. In general, for the digital carrier, the accumulator value increases as the channel bandwidth increases, whereas the accumulator value for the analog carrier decreases as the channel bandwidth increases. Therefore, analog and digital carriers can be differentiated by observing the accumulator values of the digital AGC 21 at different channel bandwidths.

As shown in FIG. 5, for the analog carrier, the sum, Sum (1:3), of the accumulator values associated with the 1 MHz, 2 MHz and 3 MHz bandwidths (735 k) is greater than the corresponding sum, Sum (4:6), for the 4 MHz, 5 MHz and 6 MHz bandwidths (439 k). On the other hand, for the digital carrier, the sum of the accumulator values for the three smaller channel bandwidths (768 k) is less than the corresponding sum for the three larger channel bandwidths (943 k). Therefore, in some exemplary embodiments, the digital AGC accumulator values can be observed at the bandwidths illustrated in FIGS. 4 and 5, and the accumulator value summations illustrated in FIG. 5 can be used to discriminate between analog and digital carriers. More particularly, if the summation value Sum (1:3) is larger than the summation value Sum (4:6), then the carrier is an analog carrier; otherwise, the carrier is a digital carrier.

Figure 6:
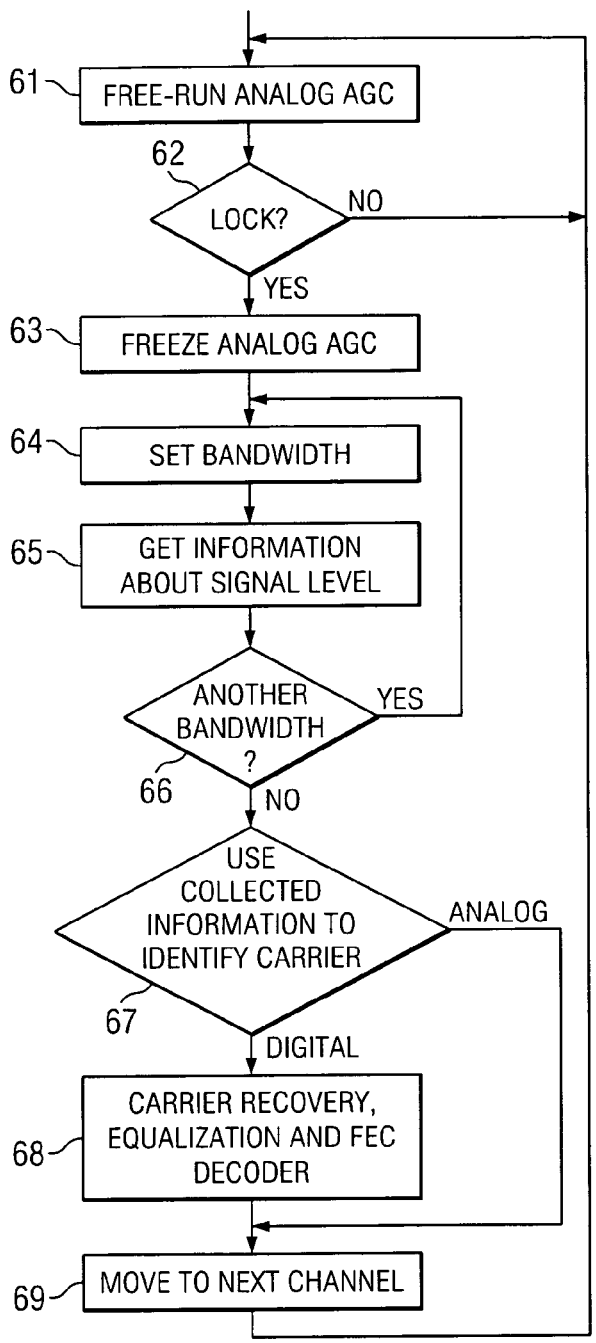
FIG. 6 illustrates exemplary operations according to the present invention for differentiating between analog and digital carriers.

FIG. 6 illustrates exemplary operations for discriminating between analog and digital carriers according to the invention. The analog AGC is allowed to free-run at 61, and it eventually locks at 62. After the analog AGC locks at 62, it is frozen at 63. The channel bandwidth BW is then set at 64, after which information indicative of the signal level (e.g., digital AGC accumulator values) is obtained at 65. As shown at 66, the operations at 64 and 65 can be repeated for as many different channel bandwidths as desired. After collecting the signal level information for all desired channel bandwidths, this collected signal level information is used at 67 to determine whether the carrier is analog or digital. If the carrier is analog, then the receiver moves to the next channel at 69, after which operations can return to 61 where the analog AGC can free-run again. If the carrier is digital, then at 68 the carrier recovery, equalizer and FEC decoder module can execute the conventional scanning algorithm to determine the characteristics of the digital carrier.

As illustrated in FIG. 6, an analog carrier can be identified without resort to the scanning algorithm in the carrier recovery, equalizer and FEC decoder module, that is, without exhaustively trying (and ultimately failing) to determine a symbol rate/modulation scheme combination of a digital carrier.

Figure 7:
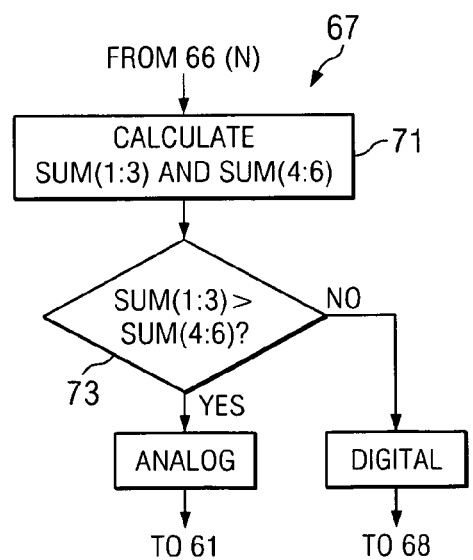
FIG. 7 illustrates a detailed example of an operation of FIG. 6.

FIG. 7 illustrates a more detailed example of the operation at 67 in FIG. 6. At 71, the summation values of FIG. 5 are calculated, and these summation values are compared at 73. If Sum (1:3) is greater than Sum (4:6), then the carrier is identified as analog. Otherwise the carrier is identified as digital.

FIG. 8 diagrammatically illustrates exemplary embodiments of a demodulator portion of a digital cable communication receiver according to the invention, capable of performing exemplary operations described above relative to FIGS. 5-7. In particular, a carrier identifier 81 provides a bandwidth control signal (BWc) to the Nyquist filter 19, thereby to adjustably control the channel bandwidth by adjusting the bandwidth of the Nyquist filter. The carrier identifier 81 receives from the accumulator (ACC) of the digital AGC 21 the accumulator values for each of the respective bandwidths to which the Nyquist filter is set. Based on these accumulator values, the carrier identifier 81 determines whether the carrier is analog or digital. If the carrier is determined to be digital, then at 83 the carrier identifier 81 enables the carrier recovery, equalizer and FEC decoder module 23 to perform the conventional scanning algorithm. If the carrier is determined to be analog, then at 85 the carrier identifier 81 enables the analog AGC 15 to free-run again.

It will be evident to workers in the art that the exemplary carrier identifier embodiments illustrated in FIGS. 5-8 can be readily implemented, for example, by suitably modifying software in conventional demodulator arrangements of the type shown generally, for example, in FIG. 1. Of course, other embodiments may implement the carrier identifier in hardware, or a combination of hardware and software.

Although exemplary embodiments of the invention are described above in detail, this does not limit the scope of the invention, which can be practiced in a variety of embodiments.

What is claimed is:

1. A method of characterizing a communication signal carrier transmitted on a communication channel in a digital cable communication receiver, comprising:
    setting a bandwidth of the communication channel to a plurality of different bandwidth values;
    for each of the bandwidth values, obtaining information indicative of a corresponding signal level present in the communication channel when set to that bandwidth, the signal level information including a plurality of digital values respectively associated with the plurality of bandwidth values;
    using the signal level information associated with the plurality of bandwidth values to determine whether the communication signal carrier is a digital carrier, wherein using the signal level information associated with the plurality of bandwidth values to determine whether the communication signal carrier is a digital carrier includes determining a sum of the digital values;
    setting the bandwidth of the communication channel to a further plurality of different bandwidth values which each differ from said plurality of bandwidth values, said signal level information including a further plurality of digital values respectively associated with said further plurality of bandwidth values; and
    determining a further sum of said further digital values.

2. The method of claim 1, further comprising:
    obtaining the signal level information from a digital automatic gain control process.

3. The method of claim 1, further comprising:
    wherein said plurality of bandwidth values are 1 MHz, 2 MHz, and 3 MHz, and said further plurality of bandwidth values are 4 MHz, 5 MHz and 6 MHz.

4. The method of claim 1, further comprising:
    comparing said sum of said digital values to said further sum of said further digital values.

5. The method of claim 4, further comprising:
    identifying the communication signal carrier as analog if said sum of said digital values is greater than said further sum of said further digital values.

6. The method of claim 5, further comprising:
    identifying the communication signal carrier as digital if said further sum of said further digital values is greater than said sum of said digital values.

7. The method of claim 6, wherein each of said further plurality of bandwidth values is larger than each of said plurality of bandwidth values.

8. The method of claim 7, wherein said plurality of bandwidth values are 1 MHz, 2 MHz, and 3 MHz, and said further plurality of bandwidth values are 4 MHz, 5 MHz and 6 MHz.

9. The method of claim 1, wherein the communication signal carrier is one of a digital QAM carrier and an analog NTSC carrier.

10. The method of claim 1, including, before setting the bandwidth of the communication channel to the plurality of different bandwidth values, both free-running an analog automatic gain control process until the analog automatic gain control process locks and freezing the locked analog automatic gain control process.

11. An apparatus for characterizing a communication signal carrier transmitted on a communication channel in a digital cable communication receiver, comprising:
 a bandwidth adjuster configured to set a bandwidth of the communication channel to a plurality of different bandwidth values;
 a signal level monitor coupled to the communication channel and configured to obtain, for each of the bandwidth values, information indicative of a corresponding signal level present in the communication channel when set to that bandwidth, the signal level information including a plurality of digital values respectively associated with the plurality of bandwidth values; and
 a carrier identifier coupled to said signal level monitor and configured to use the signal level information associated with the plurality of bandwidth values to determine whether the communications signal carrier is an analog carrier,
 wherein using the signal level information associated with the plurality of bandwidth values to determine whether the communication signal carrier is an analog carrier by the carrier identifier includes determining a sum of the digital values, and
 wherein said bandwidth adjuster is configured to set the bandwidth of the communication channel to a further plurality of different bandwidth values which each differ from said plurality of bandwidth values, said signal level information including a further plurality of digital values respectively associated with said further plurality of bandwidth values, and said carrier identifier is configured to determine a further sum of said further digital values.

12. The apparatus of claim 11, wherein said signal level monitor is provided as part of a digital automatic gain controller.

13. The apparatus of claim 11, wherein said plurality of bandwidth values are 1 MHz, 2 MHz, and 3 MHz, and said further plurality of bandwidth values are 4 MHz, 5 MHz and 6 MHz.

14. The apparatus of claim 11, wherein said carrier identifier is configured to compare said sum of said digital values to said further sum of said further digital values.

15. The apparatus of claim 14, wherein said carrier identifier is configured to determine the communication signal carrier as analog if said sum of said digital values is greater than said further sum of said further digital values.

16. The apparatus of claim 14, wherein said carrier identifier is configured to determine the communication signal carrier as digital if said further sum of said further digital values is greater than said sum of said digital values.

17. A method of characterizing a communication signal carrier transmitted on a communication channel in a digital cable communication receiver, comprising:
 setting a bandwidth of the communication channel to a plurality of different bandwidth values;
 for each of the bandwidth values, obtaining information indicative of a corresponding signal level present in the communication channel when set to that bandwidth, the signal level information including a plurality of digital values respectively associated with the plurality of bandwidth values;
 using the signal level information associated with the plurality of bandwidth values to determine whether the communication signal carrier is an analog carrier by determining a sum of the digital values;
 setting the bandwidth of the communication channel to a further plurality of different bandwidth values which each differ from said plurality of bandwidth values, said signal level information including a further plurality of digital values respectively associated with said further plurality of bandwidth values; and
 determining a further sum of said further digital values.

18. The method of claim 17, further comprising:
 comparing said sum of said digital values to said further sum of said further digital values.

19. The method of claim 18, further comprising:
 identifying the communication signal carrier as analog if said sum of said digital values is greater than said further sum of said further digital values.

20. The method of claim 18, further comprising:
 identifying the communication signal carrier as digital if said further sum of said further digital values is greater than said sum of said digital values.

* * * * *